(12) United States Patent
Nakajima et al.

(10) Patent No.: US 12,124,340 B2
(45) Date of Patent: Oct. 22, 2024

(54) MANAGEMENT METHOD, RECORDING MEDIUM, AND MANAGEMENT APPARATUS

(71) Applicant: Hitachi, Ltd., Tokyo (JP)

(72) Inventors: Noriko Nakajima, Tokyo (JP); Jun Nakajima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 71 days.

(21) Appl. No.: 18/109,676

(22) Filed: Feb. 14, 2023

(65) Prior Publication Data

US 2024/0045773 A1 Feb. 8, 2024

(30) Foreign Application Priority Data

Aug. 5, 2022 (JP) ................................ 2022-125292

(51) Int. Cl.
*G06F 11/14* (2006.01)

(52) U.S. Cl.
CPC ................................ *G06F 11/1469* (2013.01)

(58) Field of Classification Search
CPC ................. G06F 11/14; G06F 11/1469; G06F 11/1461
See application file for complete search history.

(56) References Cited

U.S. PATENT DOCUMENTS

| | | | | |
|---|---|---|---|---|
| 7,552,358 B1* | 6/2009 | Asgar-Deen | ........ | G06F 11/1435 714/15 |
| 7,558,928 B1* | 7/2009 | DeVos | ................ | G06F 11/1448 707/999.203 |
| 7,729,926 B1* | 6/2010 | Hopwood | .......... | G06Q 30/0283 705/400 |
| 10,891,201 B1* | 1/2021 | Kozlovsky | .......... | G06F 11/1469 |
| 2011/0145528 A1* | 6/2011 | Watanabe | ........... | G06F 11/1456 711/E12.103 |
| 2011/0295809 A1 | 12/2011 | Tatebe et al. | | |
| 2012/0254125 A1* | 10/2012 | Bosson | ................. | H04L 9/0822 707/E17.005 |

(Continued)

FOREIGN PATENT DOCUMENTS

JP 2011-248668 A 12/2011

*Primary Examiner* — Hiep T Nguyen
(74) *Attorney, Agent, or Firm* — MATTINGLY & MALUR, PC

(57) ABSTRACT

A management apparatus including a storage device configured to store restoration rules which define a plurality of patterns relating to the restoration in a restoration configuration indicating a copy source and a copy destination of the data, and backup configuration information relating to the backup source and the backup destination of the data, the management apparatus executes: specification processing of specifying restoration target data; selection processing of selecting a specific restoration rule from the restoration rules; and generation processing of generating, by referring to the backup configuration information, in a restoration configuration of the restoration target data in which the backup source of the restoration target data specified by the specification processing is the copy destination and the backup destination of the restoration target data is the copy source, a restoration pattern of the restoration target data in accordance with the specific restoration rule selected by the selection processing.

15 Claims, 16 Drawing Sheets

(56) References Cited

U.S. PATENT DOCUMENTS

| | | | | |
|---|---|---|---|---|
| 2015/0301897 A1* | 10/2015 | Jeon | ...................... | H04W 12/35 |
| | | | | 707/640 |
| 2018/0143767 A1* | 5/2018 | Sugimoto | ............... | G06F 3/065 |
| 2021/0349748 A1* | 11/2021 | Dunfey | ................... | G06F 3/065 |
| 2022/0261318 A1* | 8/2022 | Hight | .................. | G06F 11/1469 |

* cited by examiner

| TASK ID | TASK NAME | PRIORITY | REQUIREMENT | | DATA NAME |
|---|---|---|---|---|---|
| | | | RESTORATION LEVEL | REQUESTED RESTORATION TIME | |
| B1 | EC SITE | HIGH | TASK | 120s | D1-1 |
| | | | | | D1-2 |
| B2 | FINANCIAL SYSTEM | MEDIUM | DATA | 30min | D2-1 |
| | | | | | D2-2 |
| B3 | PERFORMANCE ANALYSIS | LOW | DATA | 1 MONTH | D1-1 |
| | | | | | D2-2 |
| | | | | | D3-1 |
| | | | | | D3-2 |
| B4 | SETTLEMENT SYSTEM | HIGH | TASK | 0s | D4-1 |
| | | | | | D4-2 |

| | | | BACKUP SOURCE | | | BACKUP DESTINATION | | |
|---|---|---|---|---|---|---|---|---|
| DATA NAME | DATA AMOUNT (GB) | TASK ID | SITE ID | DISK TYPE | DATA STORAGE DESTINATION | VENDER NAME | SERVICE NAME | DATA STORAGE DESTINATION |
| D1-1 | 800 | B1<br>B3 | DC1 | HDD | vol 2 | CV1 | OBJECT STORAGE SERVICE 1 | bucket1 |
| D1-2 | 1200 | B1 | DC1 | HDD | vol 2 | CV1 | OBJECT STORAGE SERVICE 1 | bucket1 |
| D2-1 | 500 | B2 | DC1 | HDD | vol 2 | CV1 | OBJECT STORAGE SERVICE 2 | bucket2 |
| D2-2 | 1000 | B2<br>B3 | DC1 | HDD | vol 2 | CV1 | OBJECT STORAGE SERVICE 2 | bucket2 |
| D3-1 | 5000 | B3 | DC1 | HDD | vol 2 | CV1 | OBJECT STORAGE SERVICE 2 | bucket3 |
| D3-2 | 10000 | B3 | DC1 | HDD | vol 2 | CV1 | OBJECT STORAGE SERVICE 2 | bucket4 |
| D4-1 | 500 | B4 | DC1 | SDS | vol 1 | CV1 | BLOCK STORAGE SERVICE 1 | vol c1 |
| D4-2 | 300 | B4 | DC1 | SDS | vol 1 | CV1 | BLOCK STORAGE SERVICE 1 | vol c1 |

FIG. 4

| VENDER NAME (431) | SERVICE NAME (432) | FORM (501) | COST INFORMATION (502) | FREE TIER (503) |
|---|---|---|---|---|
| CV1 | OBJECT STORAGE SERVICE 1 | OBJECT STORAGE | C1 | STORED FILE: UP TO 5 GB / 20,000 GET REQUESTS |
| CV1 | OBJECT STORAGE SERVICE 2 | OBJECT STORAGE | C2 | STORED FILE: UP TO 5 GB / 20,000 GET REQUESTS |
| CV1 | OBJECT STORAGE SERVICE 3 | OBJECT STORAGE | C3 | STORED FILE: UP TO 5 GB / 20,000 GET REQUESTS |
| CV1 | OBJECT STORAGE SERVICE 4 | OBJECT STORAGE | C4 | STORED FILE: UP TO 5 GB / 20,000 GET REQUESTS |
| CV1 | BLOCK STORAGE SERVICE 1 | BLOCK STORAGE | C5 | UP TO 3,000 IOPS / UP TO 125 MB/SECOND |
| CV1 | SERVER INSTANCE 1 | SERVER INSTANCE | C6 | USE OF 750 HOURS/MONTH |

| 432 | 601 | 602 | 603 | 604 | 605 | 606 |
|---|---|---|---|---|---|---|
| | | | | COST INFORMATION | | |
| SERVICE NAME | PROVI-SIONING | IOPS | THROUGH-PUT | DATA EXTRACTION REQUEST | DATA TRANSFER TO OUTSIDE | DATA TRANSFER BETWEEN SERVICES |
| OBJECT STORAGE SERVICE 1 | Null | Null | Null | 0.005 USD/ 1,000 REQUESTS | FIRST 10 TB/MONTH: 0.09 USD/GB<br>NEXT 40 TB/MONTH: 0.0085 USD/GB<br>NEXT 100 TB/MONTH: 0.07 USD/GB<br>150 TB/MONTH OR MORE: 0.05 USD/GB | 0.01 USD/1,000 REQUESTS (INPUT) — C1 |
| OBJECT STORAGE SERVICE 2 | Null | Null | Null | 0.005 USD/ 1,000 REQUESTS | FIRST 10 TB/MONTH: 0.09 USD/GB<br>NEXT 40 TB/MONTH: 0.0085 USD/GB<br>NEXT 100 TB/MONTH: 0.07 USD/GB<br>150 TB/MONTH OR MORE: 0.05 USD/GB | 0.01 USD/1,000 REQUESTS (INPUT) — C2 |
| OBJECT STORAGE SERVICE 3 | Null | Null | Null | 0.005 USD/ 1,000 REQUESTS | FIRST 10 TB/MONTH: 0.09 USD/GB<br>NEXT 40 TB/MONTH: 0.0085 USD/GB<br>NEXT 100 TB/MONTH: 0.07 USD/GB<br>150 TB/MONTH OR MORE: 0.05 USD/GB | 0.01 USD/1,000 REQUESTS (INPUT) — C3 |

(502)

| 432 | | | | | | |
|---|---|---|---|---|---|---|
| | | 502 | | | | |
| | | COST INFORMATION | | | | |
| SERVICE NAME | PROVI-SIONING (601) | IOPS (602) | THROUGHPUT (603) | DATA EXTRACTION REQUEST (604) | TRANSFER DATA TO OUTSIDE (605) | DATA TRANSFER BETWEEN SERVICES (606) |
| OBJECT STORAGE SERVICE 4 | Null | Null | Null | 0.02 USD/1,000 REQUESTS | FIRST 10 TB/MONTH: 0.09 USD/GB<br>NEXT 40 TB/MONTH: 0.0085 USD/GB<br>NEXT 100 TB/MONTH: 0.07 USD/GB<br>150 TB/MONTH OR MORE: 0.05 USD/GB | 0.02 USD/1,000 REQUESTS (INPUT) |
| BLOCK STORAGE SERVICE 1 | 0.08 USD/ GB MONTH | 0.005 USD/ (IOPS) | 0.04 USD/ (MB/SECOND) | Null | Null | Null |
| SERVER INSTANCE 1 | 0.125 USD/ GB MONTH | Null | Null | Null | FIRST 10 TB/MONTH: 0.09 USD/GB<br>NEXT 40 TB/MONTH: 0.0085 USD/GB<br>NEXT 100 TB/MONTH: 0.07 USD/GB<br>150 TB/MONTH OR MORE: 0.05 USD/GB | Null |

| | | RESTORATION RULE R1 | RESTORATION RULE R2 | RESTORATION RULE R3 |
|---|---|---|---|---|
| APPLICATION UNIT | | ALL DATA | DATA GROUPED BY TASK | DATA GROUPED BY TASK |
| RESTORATION LEVEL | | DATA | DATA | DATA |
| RESTORATION CONFIGURATION | COPY SOURCE | BACKUP DESTINATION CLOUD STORAGE | BACKUP DESTINATION CLOUD STORAGE | BACKUP DESTINATION CLOUD STORAGE |
| | COPY DESTINATION | ON-PREMISES BACKUP SOURCE STORAGE | ON-PREMISES BACKUP SOURCE STORAGE | ON-PREMISES BACKUP SOURCE STORAGE |
| APPLICATION CONDITION | | NONE (ALL CASES ARE TARGET) | NONE (ALL CASES ARE TARGET) | - COPY DESTINATION CLOUD STORAGE HAS FREE TIER (VALUE≠NULL)<br>- DATA CAN BE DIVIDED TO FIT TO FREE TIER |
| RESTORATION PROCEDURE | | 1. SPECIFY ALL TARGET FILES<br>2. EXTRACT DATA FOR ALL FILES OF "1," AND COPY TO COPY SOURCE | 1. GROUP ALL TARGET FILES BY TASK<br>2. EXTRACT DATA FOR ALL FILES OF "1," FOR EACH TASK STARTING FROM TASK HAVING "HIGH PRIORITY" AND COPY TO COPY SOURCE | 1. GROUP ALL TARGET FILES BY TASK<br>2. DIVIDE INTO COPY UNIT HAVING SIZE SMALLER THAN DATA TRANSFER AMOUNT OF FREE TIER OF COPY DESTINATION IN "1."<br>3. EXTRACT DATA AND COPY TO COPY SOURCE |
| RESTORATION COST CALCULATION EQUATION | | COPY DATA EXTRACTION COST | COPY DATA EXTRACTION COST | FREE TIER+COPY DATA EXTRACTION COST (WHEN UNAPPLIED PART EXISTS) |
| RESTORATION TIME CALCULATION EQUATION | | DATA COPY TIME FROM COPY DESTINATION TO COPY SOURCE | DATA COPY TIME FROM COPY DESTINATION TO COPY SOURCE | DATA COPY TIME FROM COPY DESTINATION TO COPY SOURCE |

FIG. 9

| | | RESTORATION RULE R4 | | RESTORATION RULE R5 |
|---|---|---|---|---|
| 901 | APPLICATION UNIT | ALL DATA/DATA GROUPED BY TASK | | DATA GROUPED BY TASK |
| 341 | RESTORATION LEVEL | DATA | | TASK |
| 902 | RESTORATION CONFIGURATION — COPY SOURCE (921) | BACKUP DESTINATION CLOUD STORAGE | CLOUD STORAGE DIFFERENT FROM BACKUP DESTINATION | BACKUP DESTINATION CLOUD STORAGE |
| | COPY DESTINATION (922) | CLOUD STORAGE DIFFERENT FROM BACKUP DESTINATION | ON-PREMISES BACKUP SOURCE STORAGE | CLOUD STORAGE (BLOCK) DIFFERENT FROM BACKUP DESTINATION |
| 903 | APPLICATION CONDITION | - CLOUD STORAGE LOWER IN DATA EXTRACTION COST THAN BACKUP DESTINATION STORAGE EXISTS<br>- DATA TRANSFER COST BETWEEN CLOUD STORAGES IS LOWER THAN COST FOR EXTRACTING ALL TARGET DATA TO OUTSIDE OF CLOUD EXCEPT FOR DATA MIGRATION COST | | - "RESTORATION LEVEL" OF "REQUIREMENT" OF TASK TABLE HAS VALUE OF "TASK" |
| 904 | RESTORATION PROCEDURE | 1. SPECIFY OR NEWLY CREATE NEW CLOUD STORAGE<br>2. COPY ALL TARGET FILES TO CLOUD STORAGE OF "1."<br>3. EXTRACT DATA FOR ALL FILES FROM TASK HAVING "HIGH PRIORITY" AND COPY TO COPY SOURCE | | 1. CREATE SERVER INSTANCE<br>2. MAKE CONTRACT FOR CLOUD STORAGE (BLOCK) AND ATTACH TO "1."<br>3. GRANT, TO "1," ACCESS RIGHT TO CLOUD STORAGE STORING BACKUP DATA<br>4. EXTRACT TARGET TASK DATA |
| 905 | RESTORATION COST CALCULATION EQUATION | CLOUD STORAGE PROVISIONING COST+ INTER-CLOUD STORAGE DATA MIGRATION COST+ COPY DATA EXTRACTION COST | | SERVER INSTANCE PROVISIONING COST+CLOUD STORAGE PROVISIONING COST+COPY DATA EXTRACTION COST RAGE |
| 906 | RESTORATION TIME CALCULATION EQUATION | INTER-CLOUD STORAGE DATA COPY TIME+DATA COPY TIME FROM COPY DESTINATION TO COPY SOURCE+CLOUD STORAGE PROVISIONING TIME | | DATA COPY TIME FROM COPY DESTINATION TO COPY SOURCE+SERVER INSTANCE PROVISIONING TIME+CLOUD STORAGE PROVISIONING TIME |

FIG. 10

MANAGEMENT METHOD, RECORDING MEDIUM, AND MANAGEMENT APPARATUS

CLAIM OF PRIORITY

The present application claims priority from Japanese patent application No. 2022-125292 filed on Aug. 5, 2022, the content of which is hereby incorporated by reference into this application.

BACKGROUND

This invention relates to a management method, storage medium, and management apparatus for managing data.

When a client introduces a backup or a disaster recovery (DR), there is an increasing number of cases in which copied data is stored in a cloud in order to suppress a cost. When a backup is set up between on-premises and a cloud, a cost for using a public cloud is required when the data is restored, and hence it is difficult to determine an optimal restoration method in consideration of also the cost.

JP 2011-248668 A discloses that a computer system and a restoration method that can facilitate restoration work. In the computer system, an administrative server collects necessary information from at least a business server; a storage device in which a main volume is formed and another storage device in which a sub-volume is formed; the administrative server, when given a restoration request from outside, calculates the lengths of restoration time required to execute procedures of the requested restoration by a plurality of predetermined restoration formulas on the basis of information collected by an information collecting unit, determines the restoration formula taking the shortest length of restoration time to be the restoration formula for processing the restoration pertaining to the restoration request, notifies the business server of the determined restoration formula, and so controls the storage device in which the main volume is provided and the other storage device in which the sub-volume is provided as to cause the business server to process the restoration by the restoration formula notified by the administrative server.

The above-mentioned related-art restoration method is not intended for the type of restoration method which is diversified and complicated as a result of use of the storage of the public cloud as the backup destination. Moreover, the above-mentioned related-art restoration method does not consider a point of estimating the restoration cost incurred by the restoration.

SUMMARY

This invention has an object to provide a restoration pattern suited to restoration target data.

A disclosure of a management method in the present application is a management method, which is executed by a management apparatus configured to manage restoration of data backed up to a backup destination to a backup source, the management apparatus including a processor configured to execute a program, and a storage device configured to store the program, the storage device being configured to store a plurality of restoration rules which define a plurality of patterns relating to the restoration in a restoration configuration indicating a copy source and a copy destination of the data, and backup configuration information relating to the backup source and the backup destination of the data, the management method comprising executing, by the processor: specification processing of specifying restoration target data; selection processing of selecting a specific restoration rule from the plurality of restoration rules; and generation processing of generating, by referring to the backup configuration information, in a restoration configuration of the restoration target data in which the backup source of the restoration target data specified by the specification processing is the copy destination and the backup destination of the restoration target data is the copy source, a restoration pattern of the restoration target data in accordance with the specific restoration rule selected by the selection processing.

According to the representative embodiment of this invention, it is possible to provide the restoration pattern suited to the restoration target data. The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a table for showing an example of a backup configuration table.

FIG. 5 is a table for showing an example of the public cloud charge table.

FIG. 6 is a first explanatory table for showing details of the cost information of the public cloud charge table.

FIG. 7 is a second explanatory table for showing details of the cost information of the public cloud charge table.

FIG. 9 is an explanatory table for showing an example of a restoration rule table.

FIG. 10 is an explanatory table for showing an example of a restoration rule table.

DETAILED DESCRIPTION OF THE EMBODIMENTS

<Hybrid Cloud System>

Figure 1:
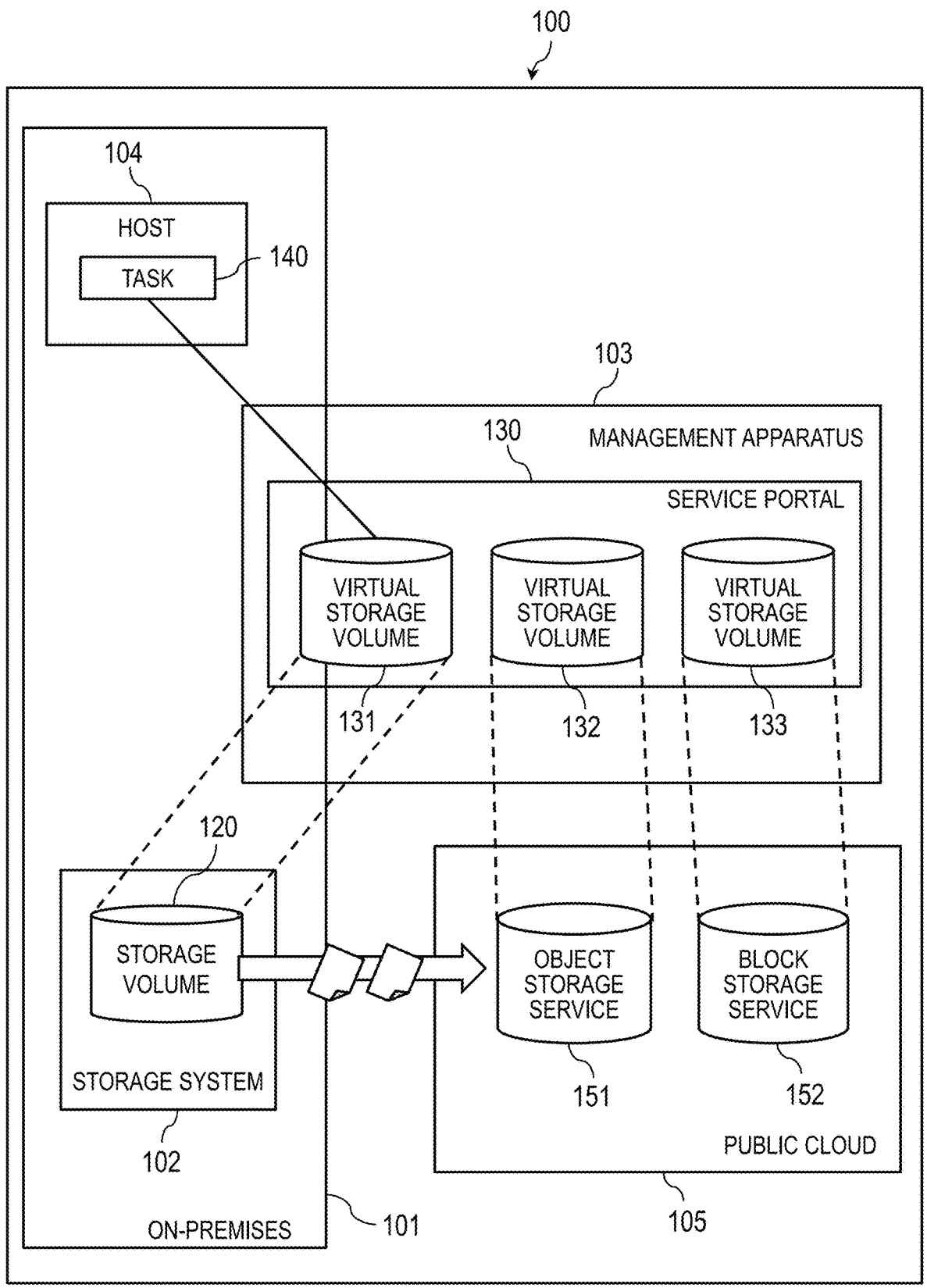
FIG. 1 is a block diagram for illustrating a system configuration example of a hybrid cloud system.

FIG. 1 is a block diagram for illustrating a system configuration example of a hybrid cloud system. A hybrid cloud system 100 is a system which backs up data from a storage system 102 of on-premises 101 to a public cloud 105 through a network such as the Internet, a local area network (LAN), or a wide area network (WAN).

The on-premises 101 include the storage system 102, a management apparatus 103, and a host 104. The storage system 102 includes a storage volume 120. The storage volume 120 is provided to the host 104 as a virtual storage volume 131.

The storage system 102 of the on-premises 101 and the public cloud 105 are also coupled to each other through a network such that communication is achieved therebetween. Between the storage system 102 of the on-premises 101 and the public cloud 105, a communication speed ([bps]) is set in accordance with a bandwidth thereof.

The management apparatus 103 includes a service portal 130. The service portal 130 provides services to the host 104. Specifically, for example, the service portal 130 includes virtual storage volumes 131 to 133. The virtual storage volume 131 is a storage area obtained by virtualizing the storage volume 120. The virtual storage volume 132 is a storage area obtained by virtualizing an object storage service 151. The virtual storage volume 133 is a storage area obtained by virtualizing a block storage service 152.

The host 104 selects a task 140 from the virtual storage volume 131, executes the task 140, stores data generated through the task 140 in the virtual storage volume 131, and instructs the management apparatus 103 to back up the data. The host 104 is a computer which uses the virtual storage volumes 131 to 133 to operate the task 140, but it is not always required to execute operations of the backup and restoration through the host 104. For example, a person (such as an administrator for the volumes different from a person who is operating the task 140 on the host 104) may issue an execution request to the management apparatus 103 through the service portal 130.

The public cloud 105 is formed of one or more computers each including a processor and a memory, and provides, to the service portal 130, the object storage service 151 as the virtual storage volume 132, and provides the block storage service 152 as the virtual storage volume 133.

The object storage service 151 is a service which provides, to the service portal 130, an object storage as the virtual storage volume 132. The object storage is a storage device which handles data in a unit called "object." The block storage service 152 is a service which provides, to the service portal 130, a block storage as the virtual storage volume 133. The block storage is a storage device which handles data in a unit called "block."

In the hybrid cloud system 100, the management apparatus 103 backs up, to the public cloud 105, data stored in the storage volume 120 corresponding to the virtual storage volume 131, and restores the data backed up to the public cloud 105 to the storage system 102.

Before the backup and the restoration, the management apparatus 103 determines a restoration pattern corresponding to a requirement for a data restoration time for the task 140 as a unit. Moreover, the management apparatus 103 calculates a restoration pattern intended to reduce a restoration cost while satisfying a requirement imposed by a user who uses the service portal 130 via the host 104. Further, the management apparatus 103 estimates a restoration cost and a copy time of data for each restoration pattern for the task 140 as a unit, and outputs results of a plurality of restoration patterns to the host 104 so that the results can be displayed. As a result, the user who uses the host 104 can recognize a relationship between the restoration costs and the restoration times among the plurality of presented restoration patterns.

<Hardware Configuration Example of Management Apparatus>

Figures 2, 3:
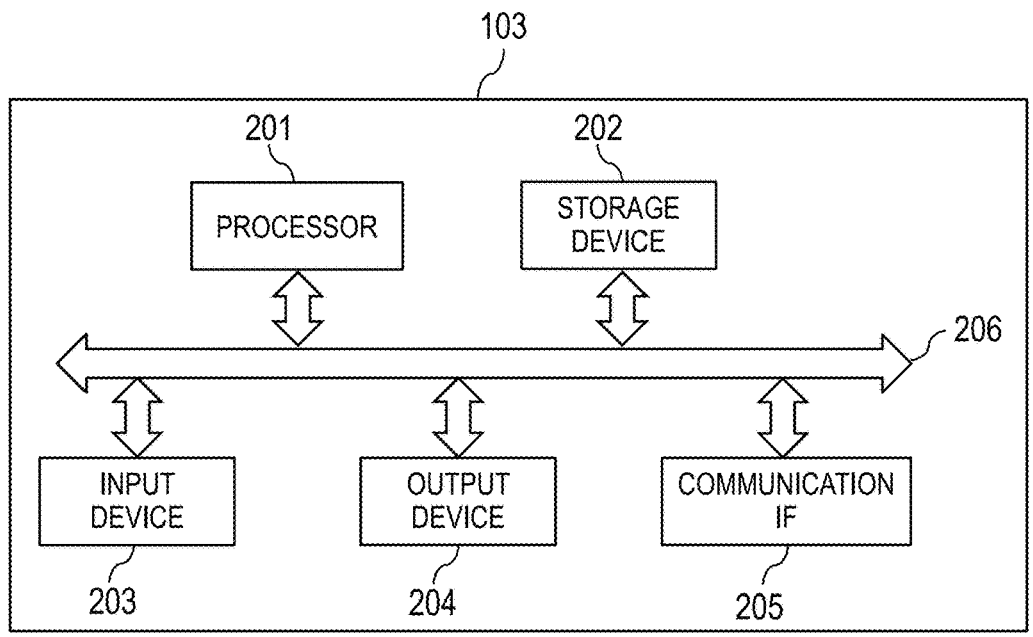
FIG. 2 is a block diagram for illustrating a hardware configuration example of the management apparatus.
FIG. 3 is a table for showing an example of a task table.

FIG. 2 is a block diagram for illustrating a hardware configuration example of the management apparatus 103. The management apparatus 103 includes a processor 201, a storage device 202, an input device 203, an output device 204, and a communication interface (communication IF) 205. The processor 201, the storage device 202, the input device 203, the output device 204, and the communication IF 205 are coupled to one another through a bus 206. The processor 201 is configured to control the computer 200. The storage device 202 serves as a work area for the processor 201. The storage device 202 is also a non-transitory or transitory recording medium configured to store various programs and various kinds of data. Examples of the storage device 202 include a read only memory (ROM), a random-access memory (RAM), a hard disk drive (HDD), and a flash memory. The input device 203 is configured to input data. Examples of the input device 203 include a keyboard, a mouse, a touch panel, a numeric keypad, a scanner and a sensor. The output device 204 is configured to output data. Examples of the output device 204 include a display, a printer, and a speaker. The communication IF 205 is coupled to the network 110, and is configured to transmit and receive data.

The computers forming the public cloud 105 and the computer forming the host 104 have configurations equivalent to that of FIG. 2.

<Task Table>

FIG. 3 is a table for showing an example of a task table. A task table 300 is a table which stores information on the tasks 140, and is stored in the storage device 202 of the management apparatus 103. The task table 300 includes, as fields, a task ID 301, a task name 302, a priority 303, a requirement 304, and a data name 305. A combination of values in the fields 301 to 305 in one row forms an entry indicating one task 140.

The task ID 301 is identification information for uniquely identifying the task 140. The task 140 is sometimes expressed by as the value of the task ID 301. For example, a task 140 having a value "B1" in the task ID 301 is sometimes referred to as "task B1."

The task name 302 is a name indicating the task 140. The priority 303 is an index used when the corresponding task 140 is restored with priority over other tasks 140. For example, when tasks 140 are to be restored, the management apparatus 103 restores the tasks 140 in an order of "high," "medium," and "low" in the priority 303.

The requirement 304 is a condition required for the task 140, and includes, as subfields, a restoration level 341 and a requested restoration time 342. The restoration level 341 is a level indicating a degree of the restoration. When the restoration level 341 is "task," the restoration level 341 indicates that an application relating to the task 140 or a virtualized resource such as the virtual storage volumes 131 to 133 is to be restored. Moreover, when the restoration level 341 is "data," the restoration level 341 indicates that data backed up to the storage of the public cloud 105 as a backup destination is to be copied to a backup source (the storage volume 120, the virtual storage volume 131, or another storage in the public cloud 105). The requested restoration time 342 is a restoration time requested to restore the corresponding task 140 up to the restoration level 341.

The data name 305 is a name of data used in the corresponding task 140. Data identified by the data name 305 is sometimes expressed by a value of the data name 305. For example, data having "D1-1" in the data name 305 is sometimes referred to as "data D1-1." Moreover, when data D1-1, data D1-2, data D2-1, . . . , are not distinguished from one another, those pieces of data are simply referred to as "data D."

One or more pieces of data D exist for each task 140. When the task 140 is, for example, an EC site, the data D1-1 and the data D1-2 may be pieces of data on different users of the EC site, or the data D1-1 may be data on reception and placement of orders and the data D1-2 may be data on settlement.

<Backup Configuration Table>

FIG. 4 is a table for showing an example of a backup configuration table. The backup configuration table 400 is a table which stores backup configuration information, is stored in the storage device 202 of the management apparatus 103, and is periodically updated.

The backup configuration table 400 includes, as fields, the data name 305, a data amount 401, the task ID 301, a backup source 402, and a backup destination 403. A combination of values in the fields in one row forms an entry indicating one piece of backup configuration information.

The data amount 401 is a capacity of the data corresponding to the data name 305. The backup source 402 is a storage holding the data identified by the data name 305 and the data amount 401. The backup source 402 includes, as subfields, a site ID 421, a disk type 422, and a data storage destination 423.

The site ID 421 is identification information for uniquely identifying a site (for example, the storage system 102) being the backup source 402. The disk type 422 is a type of a storage device of the site identified by the site ID 421. The disk type 422 is, for example, HDD, software defined storage (SDS), or solid state drive (SSD). The data storage destination 423 indicates a location at which data D identified by the data name 305 and the data amount 401 is stored as the backup source 402.

The backup destination 403 is a storage holding the data D identified by the data name 305 and the data amount 401 as a result of the backup from the backup source 402. The backup destination 403 includes, as subfields, a vender name 431, a service name 432, and a data storage destination 433.

The vender name 431 is a name of a vender which operates the public cloud 105. The service name 432 is a name of a service provided by the vender identified by the vender name 431. The data storage destination 423 indicates a location in the public cloud 105 at which data D identified by the data name 305 and the data amount 401 is stored as the backup destination 403.

<Public Cloud Charge Table>

With reference to FIG. 5 to FIG. 7, a public cloud charge table is now described. FIG. 5 is a table for showing an example of the public cloud charge table. The public cloud charge table 500 is a table which stores public cloud charge information, is stored in the storage device 202 of the management apparatus 103, and is periodically updated.

The public cloud charge table 500 includes, as fields, the vender name 431, the service name 432, a form 501, cost information 502, and a free tier 503. A combination of values in the fields in one row forms an entry indicating one piece of public cloud charge information.

The form 501 indicates hardware or software used in the service identified by the service name 432. The cost information 502 is information being a calculation source of a cost incurred when the vender identified by the vender name 431 provides the service identified by the service name 432 in the form 501. The free tier 503 indicates extents up to which the cost indicated by the cost information 502 is not charged when the vender identified by the vender name 431 provides the service identified by the service name 432 in the form 501.

FIG. 6 is a first explanatory table for showing details of the cost information 502 of the public cloud charge table 500. FIG. 7 is a second explanatory table for showing details of the cost information 502 of the public cloud charge table 500. With reference to FIG. 6, values C1 to a C3 of the cost information 502 are described. With reference to FIG. 7, values C4 to C6 of the cost information 502 are described.

In FIG. 6 and FIG. 7, the cost information 502 includes, as subfields, provisioning 601, an input/output per second (IOPS) 602, a throughput 603, a data extraction request 604, a data transfer to outside 605, and a data transfer between services 606.

The provisioning 601 is the cost information 502 (per month and GB) on a cost required to secure a resource and incurred when a storage or a server instance is created regardless of a situation in which the service identified by the service name 432 is used. The IOPS 602 indicates the cost information 502 on a cost per time of read and write of data in the service identified by the service name 432. The throughput 603 is the cost information 502 on a cost per unit data transfer speed ([MB/second]).

The data extraction request 604 is the cost information 502 on a cost for extracting data stored in the public cloud 105 in the service identified by the service name 432.

The data transfer to outside 605 is the cost information 502 on a cost for transferring data to an outside (for example, on-premises 101) of the public cloud 105. The data transfer between services 606 is the cost information 502 on a cost for transferring data between the services in the same public cloud 105.

<Restoration Rules>

Figure 8:
FIG. 8 is an explanatory diagram for illustrating an example of restoration rules. The restoration rule is a rule for restoring data or a task.

FIG. 8 is an explanatory diagram for illustrating an example of restoration rules. The restoration rule is a rule for restoring data or a task.

A restoration rule R1 is a rule for copying all backup target data from the public cloud 105 to the on-premises 101. A restoration rule R2 is a rule for copying all backup target data to the on-premises 101 sequentially starting from the restoration target data of the task 140 having a high priority 303.

A restoration rule R3 is a rule for copying data to the on-premises 101 in a unit fit to the free tier 503 in the storage of the public cloud 105 being the backup destination. A restoration rule R4 is a rule for temporarily migrating restoration target data from the storage of the public cloud 105 in which the restoration target data is stored to a storage of another public cloud 105 having a lower extraction cost, and then copying the data to the on-premises 101.

A restoration rule R5 is a rule for migrating restoration target data to a block storage provided by the block storage service 152 of the public cloud 105, setting up a virtual server instance, and using the data to execute a preliminary restoration of the task 140. The restoration rule R5 is applied to data having "task" in the restoration level 341 in the task table 300.

FIG. 9 and FIG. 10 are explanatory tables for showing an example of a restoration rule table. In FIG. 9, the restoration rules R1 to R3 are shown. In FIG. 10, the restoration rules R4 and R5 are shown. In FIG. 9 and FIG. 10, restoration rules are not limited to R1 to R5. Restoration rules may be added or corrected as required. When the restoration rules R1 to R5 are not distinguished from one another, each of the restoration rules R1 to R5 is referred to as "restoration rule R."

An application unit 901 indicates a data unit (all data or data grouped by the task 140) to which the restoration rule R is to be applied. A restoration rule table 900 is stored in the storage device 202 of the management apparatus 103. "All data" is all data D being the restoration target.

"Data grouped by the task 140" is data D classified by each task 140. For example, in FIG. 3, when the restoration target data is data D1-1 and data D1-2 of the task B1, data D1-1 and data D3-1 of a task B3, and data D4-2 of a task B4, the data D1-1 and the data D1-2 of the task B1 are "data D grouped by the task B1." Moreover, the data D1-1 and the data D3-1 of the task B3 are "data D grouped by the task B3." Further, the data D4-2 of the task B4 is "data D grouped by the task B4." A task 140 used to group the restoration target data is referred to as "grouping task."

The application unit 901 of the restoration rule R4 is "all data/data grouped by task," and means that any one of "all data" and "data grouped by task" is set as the application unit 901. For example, when a plurality of types of restoration rules R4 exist, the application unit 901 of a certain restoration rule R4 is set to "all data," and the application unit 901 of another restoration rule R4 is set to "data grouped by task."

A restoration configuration 902 indicates a backup configuration for restoring up to the restoration level 341, and includes a copy source 921 and a copy destination 922. "Backup destination cloud storage" is a storage in the public cloud 105 in which restoration target data being the copy source 921 is stored. "On-premises backup source cloud storage" is the storage system 102 in the on-premises 101 being the copy destination 922 of the restoration target data.

"Cloud storage different from backup destination" is a storage in a public cloud 105 different from "backup destination cloud storage."

An application condition 903 is a condition under which the restoration rule R is to be applied. A restoration procedure 904 indicates a procedure of the restoration in accordance with the restoration rule R. A restoration cost calculation equation 905 is a calculation equation used to calculate a restoration cost when the restoration rule R is to be applied. "Copy data extraction cost" is a cost required to extract copy data (that is, restoration target data) from the copy source 921 (backup destination 403). Specifically, for example, the restoration cost calculation equation 905 is a calculation equation which adds the data extraction request 604 and the data transfer to outside 605 or the data transfer between services 606.

Moreover, for the restoration rule R4, "cloud storage provisioning cost" and "inter-cloud storage data migration cost" are included in the restoration cost calculation equation 905. "Cloud storage provisioning cost" is a cost for provisioning a storage (hereinafter referred to as cloud storage) in the public cloud 105 so that the object storage service 151 or the block storage service 152 can be provided, is determined by the public cloud 105, and is transmitted to the management apparatus 103.

Further, "inter-cloud storage data migration cost" is a cost incurred when data is migrated between the cloud storages, is determined by the public cloud 105, and is transmitted to the management apparatus 103.

Moreover, for the restoration rule R5, "server instance provisioning cost" and "cloud storage provisioning cost" are included in the restoration cost calculation equation 905. As illustrated in FIG. 8, "server instance provisioning cost" is a cost required to start a virtual server instance required to execute preliminary restoration of the task 140 through use of data in the public cloud 105, is determined by the public cloud 105, and is transmitted to the management apparatus 103.

A restoration time calculation equation 906 is a calculation equation used to calculate a restoration time when the restoration rule R is to be applied. For example, "data copy time from copy destination to copy source" in the restoration rules R1 to R5 is calculated by dividing the data amount 401 of the data from the copy destination to the copy source by a communication speed set in advance between the copy destination and the copy source. When the copy destination is the on-premises 101, the copy source is the public cloud 105. When the copy destination is the public cloud 105, the copy source is the on-premises 101.

Moreover, any one of "inter-cloud storage data copy time," "cloud storage provisioning time," and "server instance provisioning time" is an operation time in the public cloud 105, and is calculated by the public cloud 105.

<Restoration Support Processing>

Figure 11:
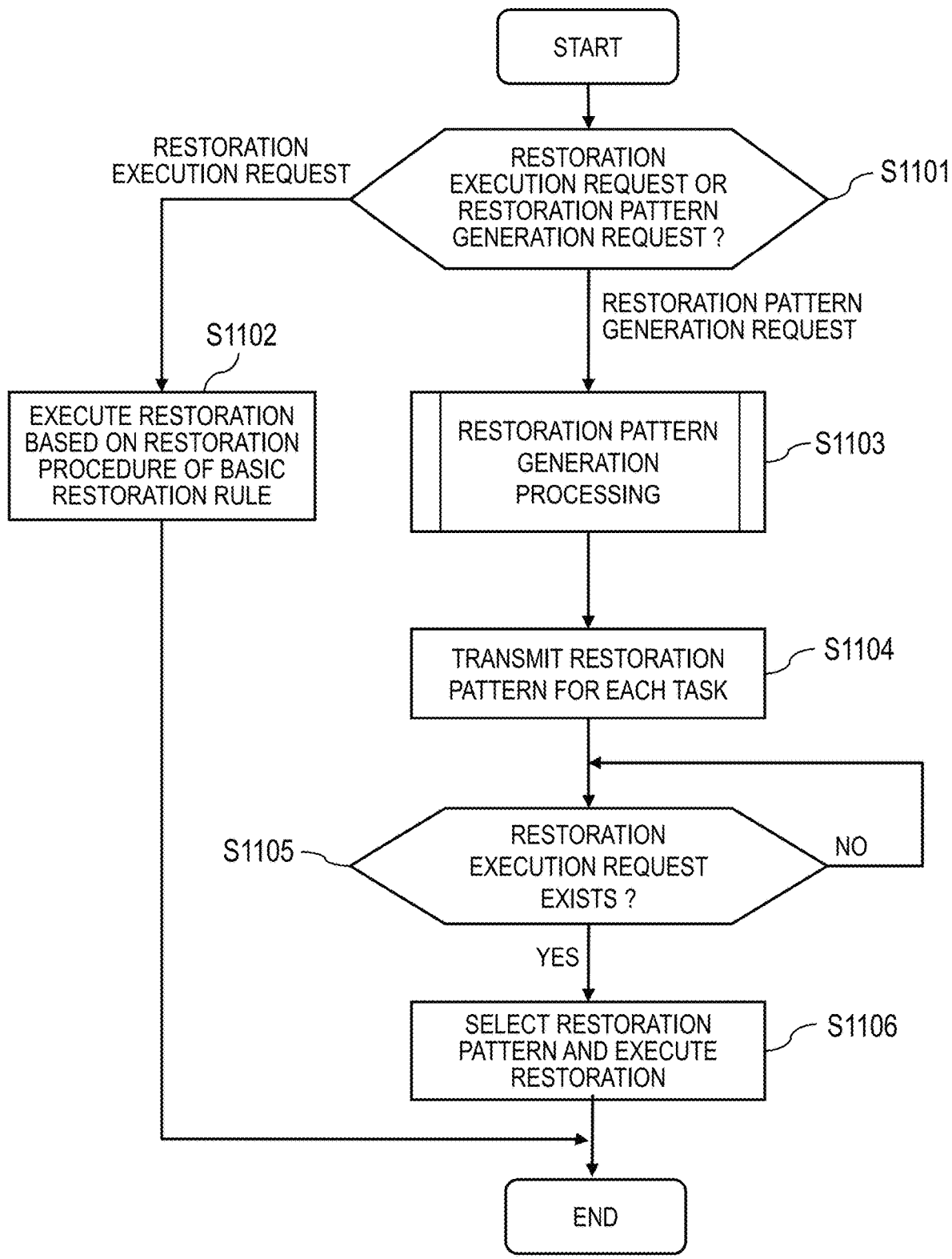
FIG. 11 is a flowchart for illustrating an example of a restoration support processing procedure executed by the management apparatus.

FIG. 11 is a flowchart for illustrating an example of a restoration support processing procedure executed by the management apparatus 103. The management apparatus 103 determines which of a restoration execution request and a restoration pattern generation request exists (Step S1101). The restoration execution request is a request which requests the management apparatus 103 to execute the restoration of data or a task. A user of the management apparatus 103 may issue the restoration execution request to the management apparatus 103 through a management portal, or the host 104 may transmit the restoration execution request to the management apparatus 103. The restoration pattern generation request is a request which is made from the host 104 to request the management apparatus 103 to calculate a restoration pattern. A restoration pattern includes at least one of the restoration procedures, the restoration cost, or the restoration time in the restoration rule R.

When the restoration execution request exists ("restoration execution request" in Step S1101), the management apparatus 103 executes the restoration based on the restoration procedure 904 of a basic restoration rule R (Step S1102). The basic restoration rule R is a restoration rule R which is set in advance and is applied when the restoration execution request exists ("restoration execution request" in Step S1101), and is, for example, the restoration rule R2.

When the restoration pattern generation request exists ("restoration pattern generation request" in Step S1101), the management apparatus 103 executes restoration pattern generation processing (Step S1103). As a result, the restoration pattern is calculated for each task 140. The management apparatus 103 transmits the restoration pattern calculated for each task 140 to the host 104 (Step S1104). As a result, the user of the host 104 or the user of the management apparatus 103 can check the restoration pattern for each task 140.

After that, the management apparatus 103 waits for the restoration execution request (No in Step S1105). When the restoration execution request exists (Yes in Step S1105), the management apparatus 103 executes the restoration for the task 140 selected by the restoration execution request in the restoration pattern selected in the restoration execution request (Step S1106).

[Restoration Pattern Generation Processing (Step S1103)]

Figure 12:
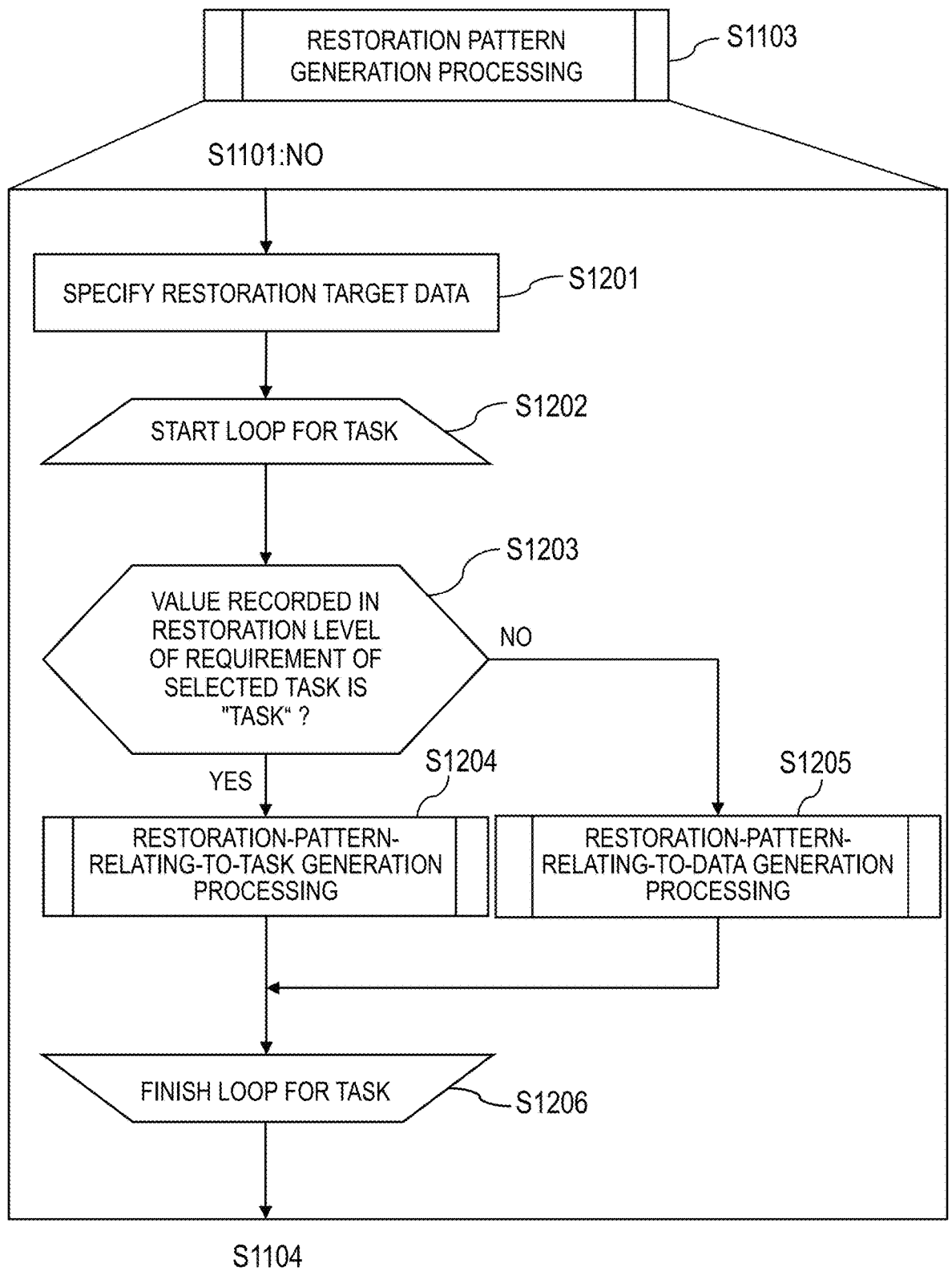
FIG. 12 is a flowchart for illustrating a detailed processing procedure example of the restoration pattern generation processing (Step S1103) of FIG. 11.

FIG. 12 is a flowchart for illustrating a detailed processing procedure example of the restoration pattern generation processing (Step S1103) of FIG. 11. The management apparatus 103 receives specification of the restoration target data from the user of the host 104 or the management apparatus 103 (Step S1201). It is assumed that information for specifying the restoration target data is included in the restoration pattern generation request.

The management apparatus 103 selects an unselected task 140 from the task table 300 (Step S1202). The management apparatus 103 determines whether or not the value of the restoration level 341 of the requirement 304 is "task" in an entry of the task 140 selected in Step S1202 (Step S1203).

When the value of the restoration level 341 is "task" (Yes in Step S1203), the management apparatus 103 executes restoration-pattern-relating-to-task generation processing for the selected task 140 (Step S1204), and advances the process to Step S1206. Meanwhile, when the value of the restoration level 341 is "data" (No in Step S1203), the management apparatus 103 executes restoration-pattern-relating-to-data generation processing for the selected task 140 (Step S1205), and advances the process to Step S1206.

In Step S1206, the management apparatus 103 determines whether or not an unselected task 140 exists in the task table 300. When an unselected task 140 exists, the management apparatus 103 returns the process to Step S1202. Meanwhile, when an unselected task 140 does not exist, the management apparatus 103 finishes the restoration pattern generation processing (Step S1103), and advances the process to Step S1104.

[Restoration-Pattern-Relating-to-Task Generation Processing (Step S1205)]

Figure 13:
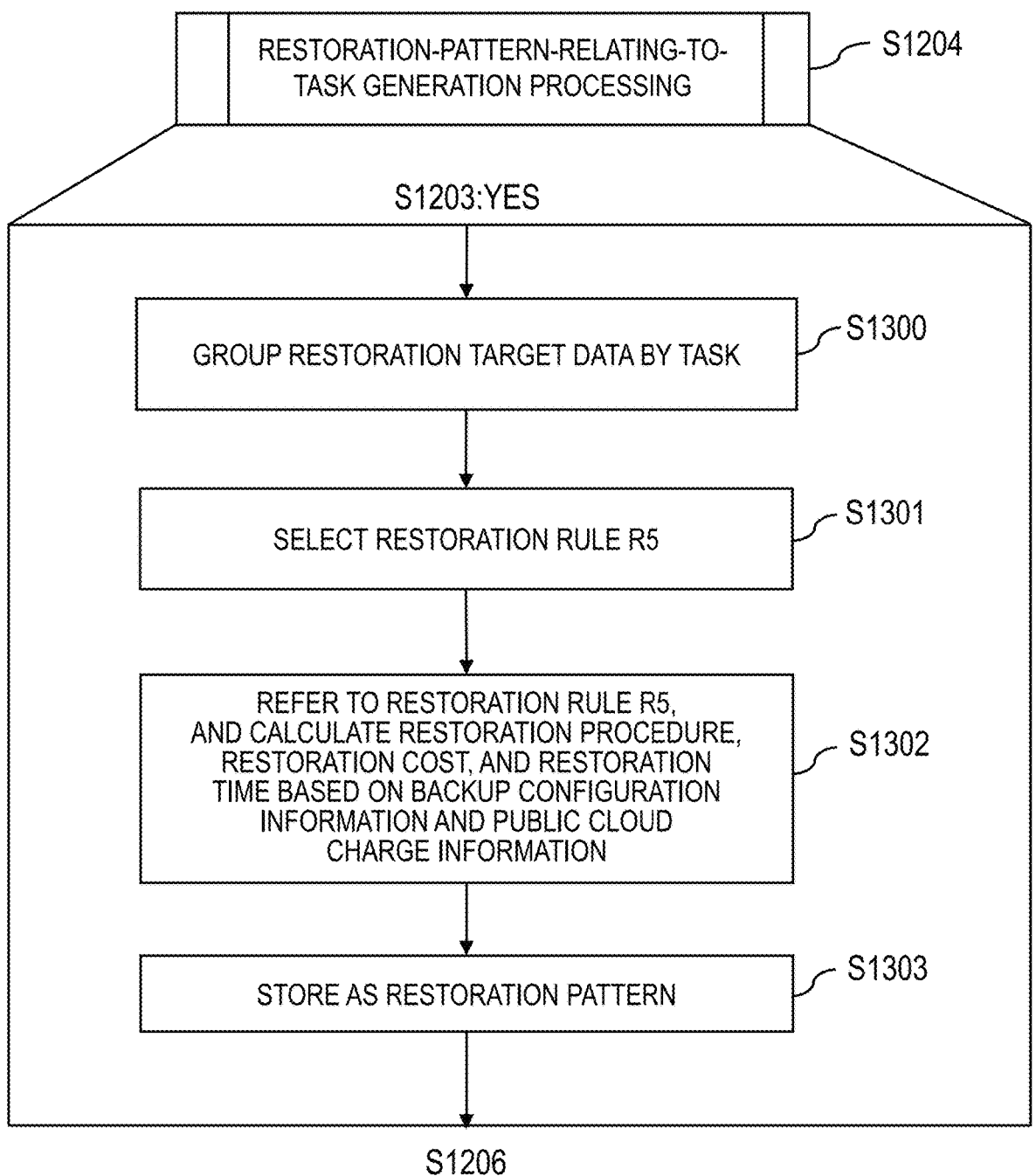
FIG. 13 is a flowchart for illustrating a detailed processing procedure example of the restoration-pattern-relating-to-task generation processing (Step S1205) of FIG. 12.

FIG. 13 is a flowchart for illustrating a detailed processing procedure example of the restoration-pattern-relating-to-task generation processing (Step S1205) of FIG. 12.

The management apparatus 103 groups the restoration target data by the selected task 140 (Step S1300). When the restoration target data includes data D of the tasks B1, B3, and B4, the management apparatus 103 groups the restoration target data by each of the tasks B1, B3, and B4. Specifically, for example, when the restoration target data is the data D1-1 and the data D1-2 of the task B1, the data D1-1 and the data D3-1 of the task B3, and the data D4-2 of the task B4, the management apparatus 103, as described above, sets the data D1-1 and the data D1-2 of the task B1 as "data D grouped by the task B1," the data D1-1 and the data D3-1 of the task B3 as "data D grouped by the task B3," and the data D4-2 of the task B4 as "data D grouped by the task B4."

The management apparatus 103 selects the restoration rule R5 from the restoration rule table 900 (Step S1301). The management apparatus 103 refers to the restoration rule R5, and calculates the restoration procedure, the restoration cost, and the restoration time based on the backup configuration information and the public cloud charge information (Step S1302).

Specifically, for example, the management apparatus 103 refers to the backup configuration table 400, to thereby identify the backup source 402 and the backup destination 403 of the restoration target data, and generates, as the restoration pattern, at least one of the restoration procedure, the restoration cost, or the restoration time, for a restoration configuration in which the backup source 402 of the restoration target data is the copy destination 922 of the restoration rule R5, and the backup destination 403 of the restoration target data is the copy source 921 of the restoration rule R5.

As the restoration procedure, the management apparatus 103 extracts the restoration procedure 904 from the restoration rule R5.

As the restoration cost, the management apparatus 103 extracts the restoration cost calculation equation 905 from the restoration rule R5. In the case of the restoration rule R5, "server instance provisioning cost+cloud storage provisioning cost+copy data extraction cost" is extracted as the restoration cost calculation equation 905.

The management apparatus 103 acquires the backup configuration information on the data grouped by the selected grouping task 140 from the backup configuration table 400. For example, when the restoration target data includes the data D1-1 and D1-2, and the selected grouping task 140 is the task B1, an entry of the data D1-1 and an entry of the data D1-2 are acquired as the backup configuration information.

Moreover, the management apparatus 103 identifies the backup destination 403 (vender name 431, service name 432, and data storage destination 433) from the acquired backup configuration information. In the above-mentioned example, from the entry of the data D1-1, there are identified "CV1" as the vender name 431, "object storage service 1" as the service name 432, and "bucket1" as the data storage destination 433 (the same applies to the data D1-2).

The management apparatus 103 identifies, from the public cloud charge table 500, as the public cloud charge information, an entry corresponding to the vender name 431 and the service name 432 of the backup destination 403 identified from the backup configuration information. In the above-mentioned example, the vender name 431 is "CV1," and the service name 432 is "object storage service 1." Thus, an entry 511 (including cost information C1) is identified as the public cloud charge information.

The management apparatus 103 substitutes the public cloud charge information into the restoration cost calculation equation 905, to thereby calculate the restoration cost for the selected grouping task 140. In the above-mentioned example, in the cost information C1 of FIG. 6, the provisioning 601 is "Null," and hence, of the restoration cost calculation equation 905 of the restoration rule R5, the server instance provisioning cost and the cloud storage provisioning cost are "0."

Meanwhile, in the service of the entry 511 (including the cost information C1), "0.005 USD/1,000 requests" is defined as the data extraction request 604. Thus, for each of the data D1-1 and D1-2, the copy data extraction cost of the restoration cost calculation equation 905 of the restoration rule R5 is calculated by multiplying 0.005 USD per 1,000 requests for extraction from "vol 2" being the data storage destination 423 of the backup source 402 by the number of requests directed to the copy source 921.

The management apparatus 103 predicts the number of requests required for the extraction from the copy source 921 based on the data amount 401. Specifically, for example, the management apparatus 103 may calculate the number of requests through use of a function which calculates the number of requests from the data amount 401, or may determine the number of requests by referring to a table (not shown) which defines the number of requests corresponding to the data amount 401. As a result, the restoration cost relating to the grouping task B1 is calculated.

As the restoration time, the management apparatus 103 extracts the restoration time calculation equation 906 from the restoration rule R5. In the case of the restoration rule R5, "data copy time from copy destination to copy source+ server instance provisioning time+cloud storage provisioning time" is extracted as the restoration time calculation equation 906.

The management apparatus 103 divides the data amount from the backup destination cloud storage being the backup destination 403 to the cloud storage (block) different from the back up destination being the backup destination 403 by a bandwidth between the copy source and the copy destination, to thereby calculate "data copy time from copy destination to copy source."

As described above, when the backup configuration information is, for example, the data D1-1 and the data D1-2, the site ID 421 of the backup source 402 is "DC1," the disk type 422 is "HDD," and the data storage destination 423 is "vol 2." Moreover, the vender name 431 of the backup destination 403 is "CV1," the service name 432 is "object storage service 1," and the data storage destination 433 is "bucket1." Further, the data amount 401 of the data D1-1 is "800 (GB)," and the data amount 401 of the data D1-2 is "1,200 (GB)." In other words, "data copy time from copy destination to copy source" is calculated by dividing a total of 2,000 GB of the data amounts 401 of the data D1-1 and the data D1-2 by a communication speed in the public cloud 105.

Moreover, the management apparatus 103 acquires, from the public cloud 105, "server instance provisioning time" and "cloud storage provisioning time" measured in the public cloud 105 when, for example, the data D1-1 and the data D1-2 of the entries of the backup configuration information are backed up.

The management apparatus 103 adds "data copy time from copy destination to copy source," which is calculated, and "server instance provisioning time" and "cloud storage provisioning time," which are acquired from the public cloud 105, to one another, to thereby calculate the restoration time of the restoration rule R5.

The management apparatus 103 stores, as the restoration pattern, the restoration procedure, the restoration cost, and the restoration time obtained in Step S1302 (Step S1303), and advances the process to Step S1206.

[Restoration-Pattern-Relating-to-Data Generation Processing (Step S1205)]

Figure 14:
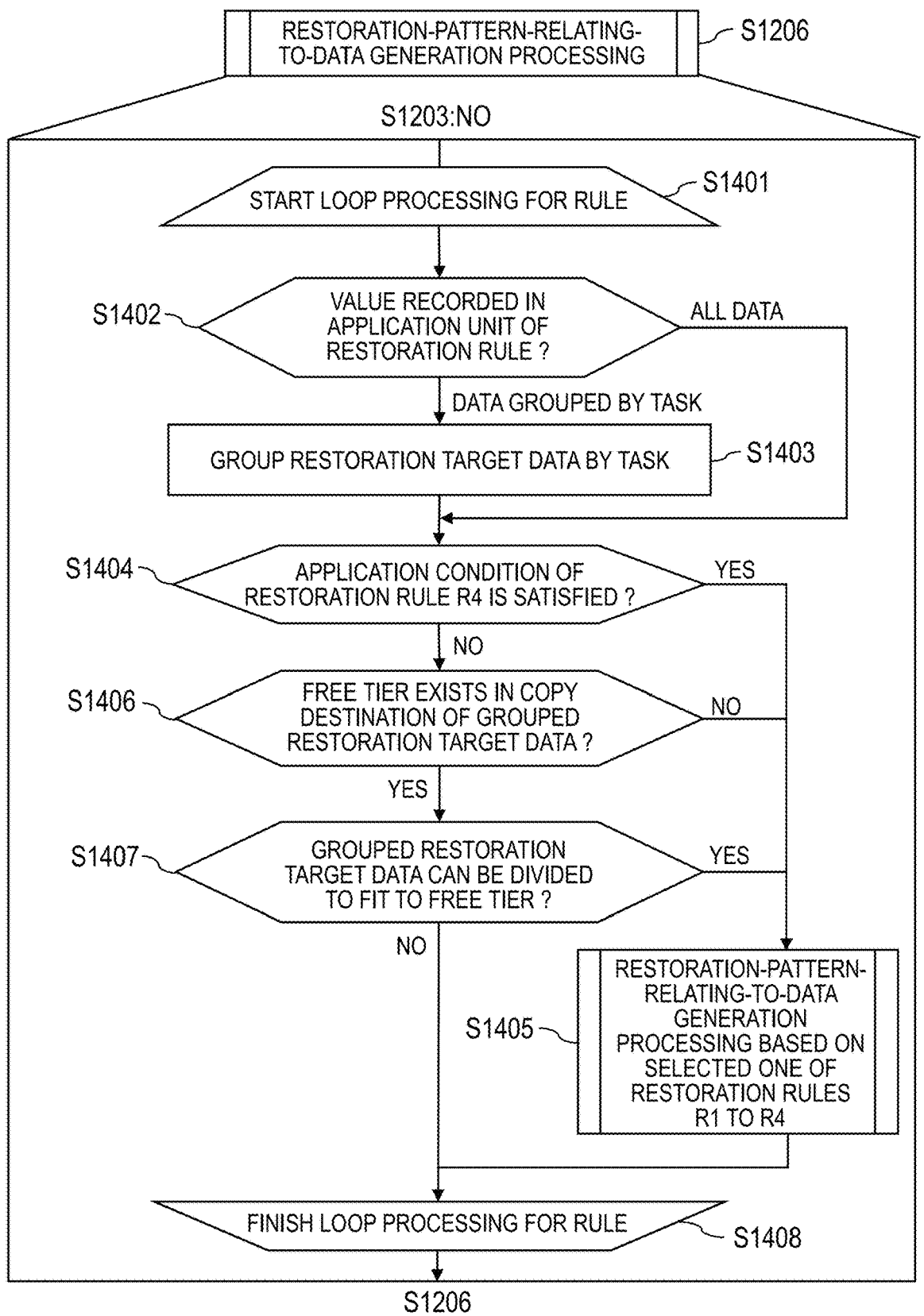
FIG. 14 is a flowchart for illustrating a detailed processing procedure example of the restoration-pattern-relating-to-data generation processing (Step S1205) of FIG. 12.

FIG. 14 is a flowchart for illustrating a detailed processing procedure example of the restoration-pattern-relating-to-data generation processing (Step S1205) of FIG. 12.

The management apparatus 103 selects an unselected restoration rule R other than the restoration rule R5 from the restoration rule table 900 (Step S1401). The management apparatus 103 refers to the application unit 901 of the selected restoration rule R (Step S1402). When the application unit 901 is "all data" ("all data" in Step S1402), the selected restoration rule R is the restoration rule R1 or R4. In this case, the management apparatus 103 advances the process to Step S1404.

When the application unit 901 is "data grouped by task" ("data grouped by task" in Step S1402), the selected restoration rule R is the restoration rule R2 or R3. In this case, the management apparatus 103 groups the restoration target data by the selected task 140 as in Step S1300 (Step S1403), and advances the process to Step S1404.

When the selected restoration rule R is the restoration rule R4, the management apparatus 103 determines whether or not the restoration target data satisfies the application condition 903 of the restoration rule R4 (Step S1404).

When the restoration target data satisfies the application condition 903 (Yes in Step S1404), the management apparatus 103 executes the restoration-pattern-relating-to-data generation processing based on the selected restoration rule (Step S1405), and advances the process to Step S1408. When the restoration target data does not satisfy the application condition 903, or the selected restoration rule R is not the restoration R4 (No in Step S1404), the management apparatus 103 determines whether or not a free tier 503 exists in the backup destination 403 of the restoration target data (Step S1406). Specifically, for example, the management apparatus 103 refers to the public cloud charge table 500, to thereby determine whether or not the vender of the backup destination 403 has a free tier 503.

For example, when the backup configuration information is the data D1-1 and the data D1-2, the vender name 431 of the backup destination 403 is "CV1," and the service name 432 thereof is "object storage 1." In other words, those pieces of data correspond to the entry 511. In the entry 511, there exists a free tier 503 having extents of "stored file: up to 5 GB" and "20,000 get requests."

When a free tier 503 does not exist (No in Step S1406), the selected restoration rule R is the restoration rule R1 or R2. In this case, the management apparatus 103 executes the restoration-pattern-relating-to-data generation processing based on the selected restoration rule (Step S1405), and advances the process to Step S1408.

Meanwhile, when a free tier 503 exists (Yes in Step S1404), the management apparatus 103 determines whether or not the grouped restoration target data can be divided so as to fit to the free tier 503 (Step S1407). For example, in the case of the data D (data D1-1 and data D1-2) grouped by the task B1, the management apparatus 103 divides the data D (data D1-1 and data D1-2) grouped by the task B1 such that the divided data of the data D (data D1-1 and data D1-2) grouped by the task B1 satisfies "stored file: up to 5 GB" and "20,000 get requests."

When the data D can be divided (Yes in Step S1407), the selected restoration rule R is the restoration rule R3. In this case, the management apparatus 103 executes the restoration-pattern-relating-to-data generation processing based on the selected restoration rule (Step S1405), and advances the process to Step S1408.

Meanwhile, when the data D cannot be divided (No in Step S1407), the selected restoration rule R corresponds to none of the restoration rules R1 to R4. Thus, the management apparatus 103 does not generate a restoration pattern, and advances the process to Step S1408.

In Step S1408, when an unselected restoration rule R exists, the management apparatus 103 returns the process to Step S1401. When an unselected restoration rule R does not exist, the management apparatus 103 finishes the restoration-pattern-relating-to-data generation processing (Step S1205), and advances the process to Step S1206.

[Restoration-Pattern-Relating-to-Data Generation Processing Based on Selected Restoration Rule (Step S1405)]

Figure 15:
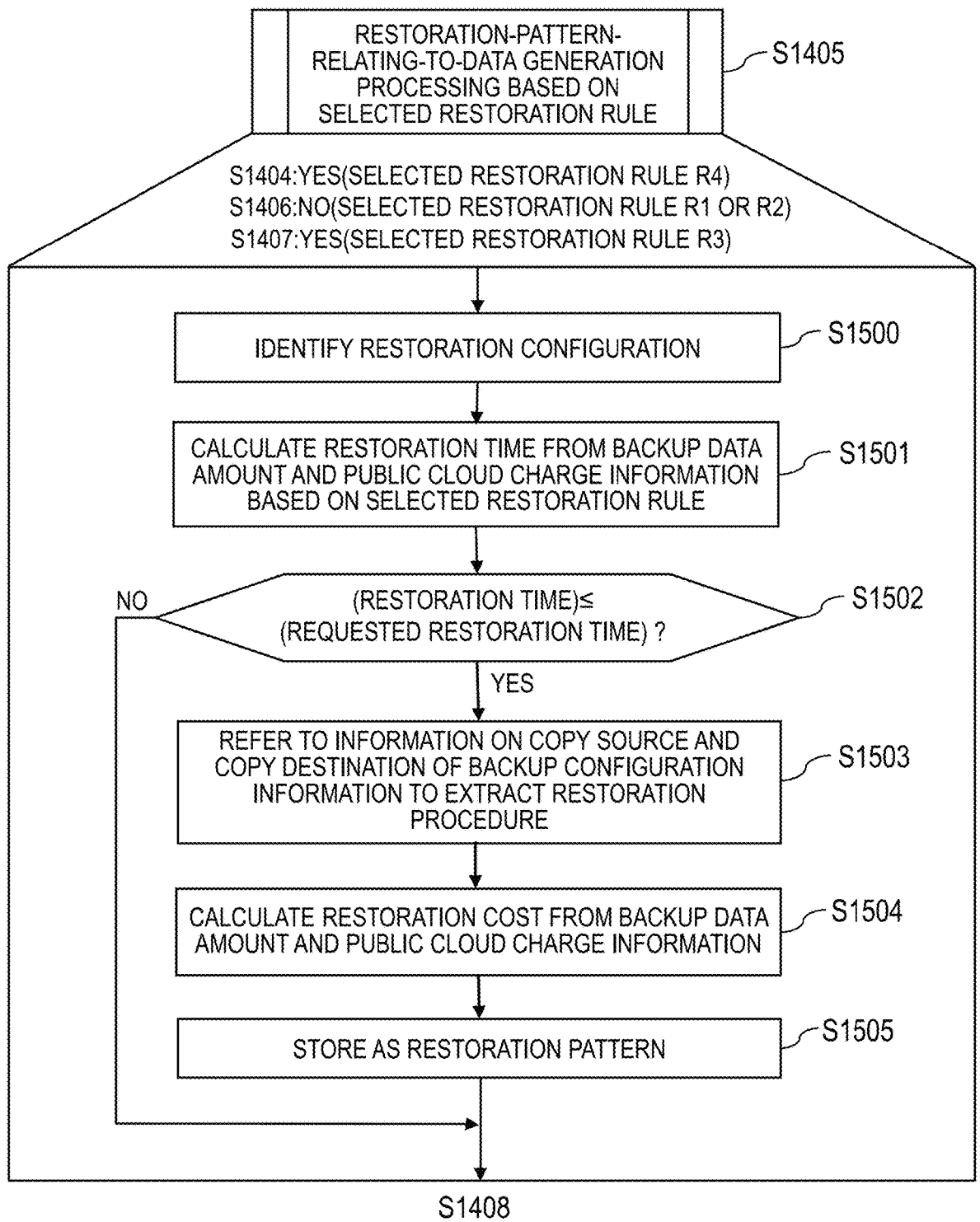
FIG. 15 is a flowchart for illustrating a detailed processing procedure example of the restoration-pattern-relating-to-data generation processing based on the selected restoration rule (Step S1405) of FIG. 14.

FIG. 15 is a flowchart for illustrating a detailed processing procedure example of the restoration-pattern-relating-to-data generation processing based on the selected restoration rule (Step S1405) of FIG. 14. The management apparatus 103 refers to the backup configuration table 400, to thereby identify the backup source 402 and the backup destination 403 of the restoration target data, identifies a restoration configuration in which the backup source 402 of the restoration target data is the copy destination 922 of one of the restoration rules R1 to R4, and the backup destination 403 of the restoration target data is the copy source 921 of one of the restoration rules R1 to R4 (Step S1500), and executes processing steps of Step S1501 to Step S1505.

The management apparatus 103 calculates the restoration time from the backup data amount and the public cloud charge information based on the selected restoration rule R (Step S1501). The calculation of the restoration time (Step S1501) is executed as in Step S1302.

The management apparatus 103 determines whether or not the calculated restoration time is equal to or shorter than the requested restoration time (Step S1502). When the calculated restoration time is not equal to or shorter than the requested restoration time (No in Step S1502), the management apparatus 103 finishes the restoration-pattern-relating-to-data generation processing based on the selected restoration rule (Step S1403), and advances the process to Step S1407.

Meanwhile, when the calculated restoration time is equal to or shorter than the requested restoration time (Yes in Step S1502), the management apparatus 103 refers to the backup source 402 and the backup destination 403 of the backup configuration information, and extracts the restoration procedure 904 of the selected restoration rule R from the restoration rule table 900 (Step S1503).

The management apparatus 103 calculates the restoration cost from the backup data amount and the public cloud charge information (Step S1504). The calculation of the restoration cost (Step S1504) is executed as in Step S1302.

The management apparatus 103 stores, as the restoration pattern, the restoration procedure, the restoration cost, and the restoration time obtained in Step S1501, Step S1503, and Step S1504 (Step S1505), finishes the restoration-pattern-relating-to-data generation processing based on the selected restoration rule (Step S1405), and advances the process to Step S1408.

<Restoration Support Start Screen>

Figure 16:
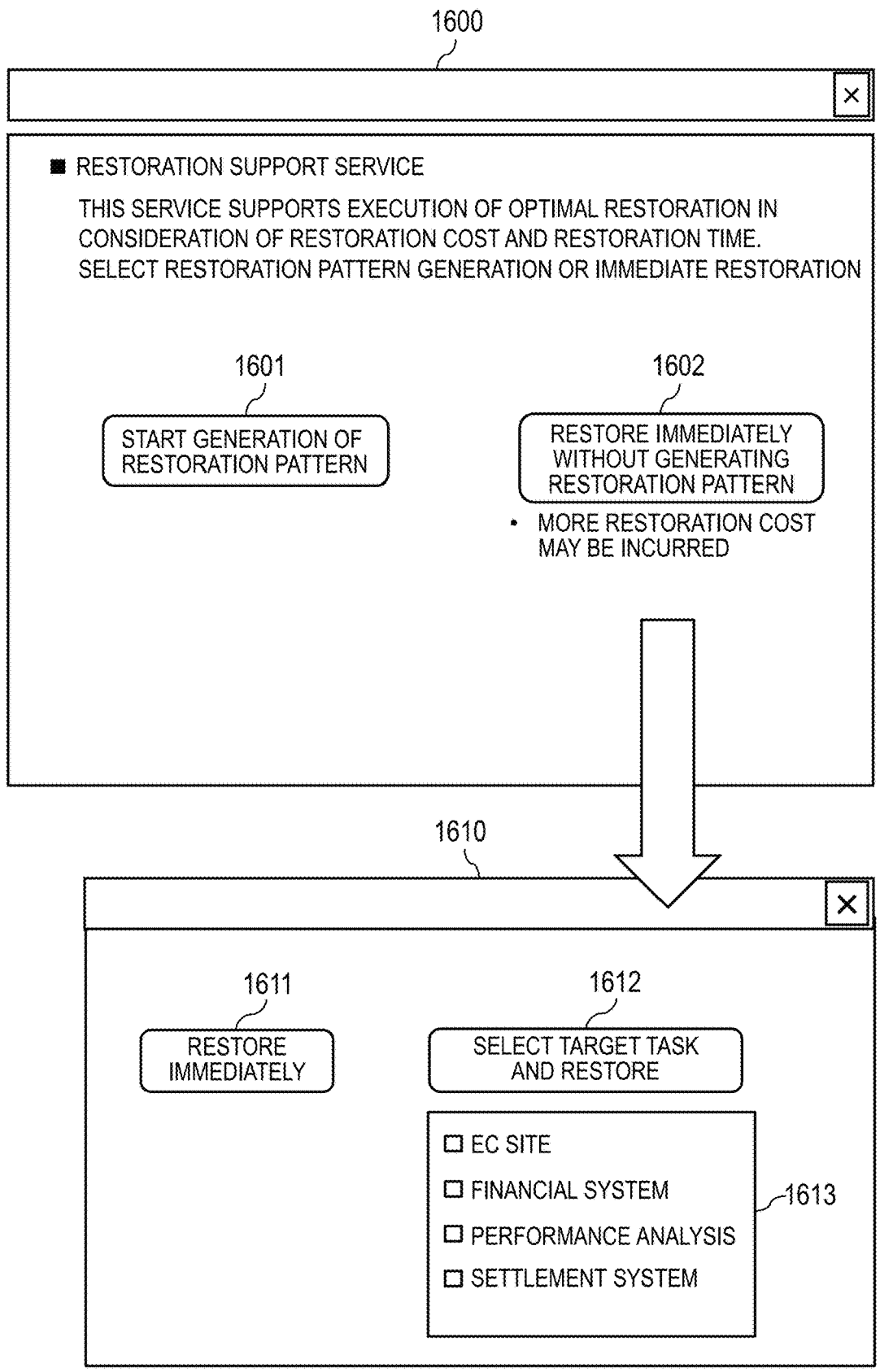
FIG. 16 is an explanatory diagram for illustrating an example of a restoration support start screen.

FIG. 16 is an explanatory diagram for illustrating an example of a restoration support start screen. A restoration support start screen 1600 is used to check the incurred cost for the restoration during the backup operation or to check the restoration procedure when a failure occurs. The restoration support start screen 1600 is displayed on a display device being an example of the output device 204 of the management apparatus 103 or the host 104. The restoration support start screen 1600 includes a restoration pattern generation start button 1601 and a restoration specification button 1602. The restoration pattern generation start button 1601 is a user interface which receives start of the calculation of the restoration pattern when the restoration pattern generation start button 1601 is pressed. The restoration specification button 1602 is a user interface which receives specification of start of the restoration when the restoration specification button 1602 is pressed. When the restoration specification button 1602 is pressed, a restoration selection screen 1610 is displayed.

The restoration selection screen 1610 includes an instantaneous restoration start button 1611, a selected task restoration start button 1612, and a target task selection checkbox field 1613. The instantaneous restoration start button 1611 is a user interface which receives start of the restoration when the instantaneous restoration start button 1611 is pressed. When the instantaneous restoration start button 1611 is pressed, the restoration is executed in accordance with the restoration procedure 904 of the restoration rule R1.

The selected task restoration start button 1612 is a user interface which receives start of the restoration of target tasks selected in the target task selection checkbox field 1613 when the selected task restoration start button 1612 is pressed. The target task selection checkbox field 1613 is a user interface which receives selection of the target tasks. When a checkbox in the target task selection checkbox field 1613 is checked, the restoration is executed in accordance with the restoration procedure 904 of the restoration rule R2.

<Restoration Cost Presentation Screen>

Figure 17:
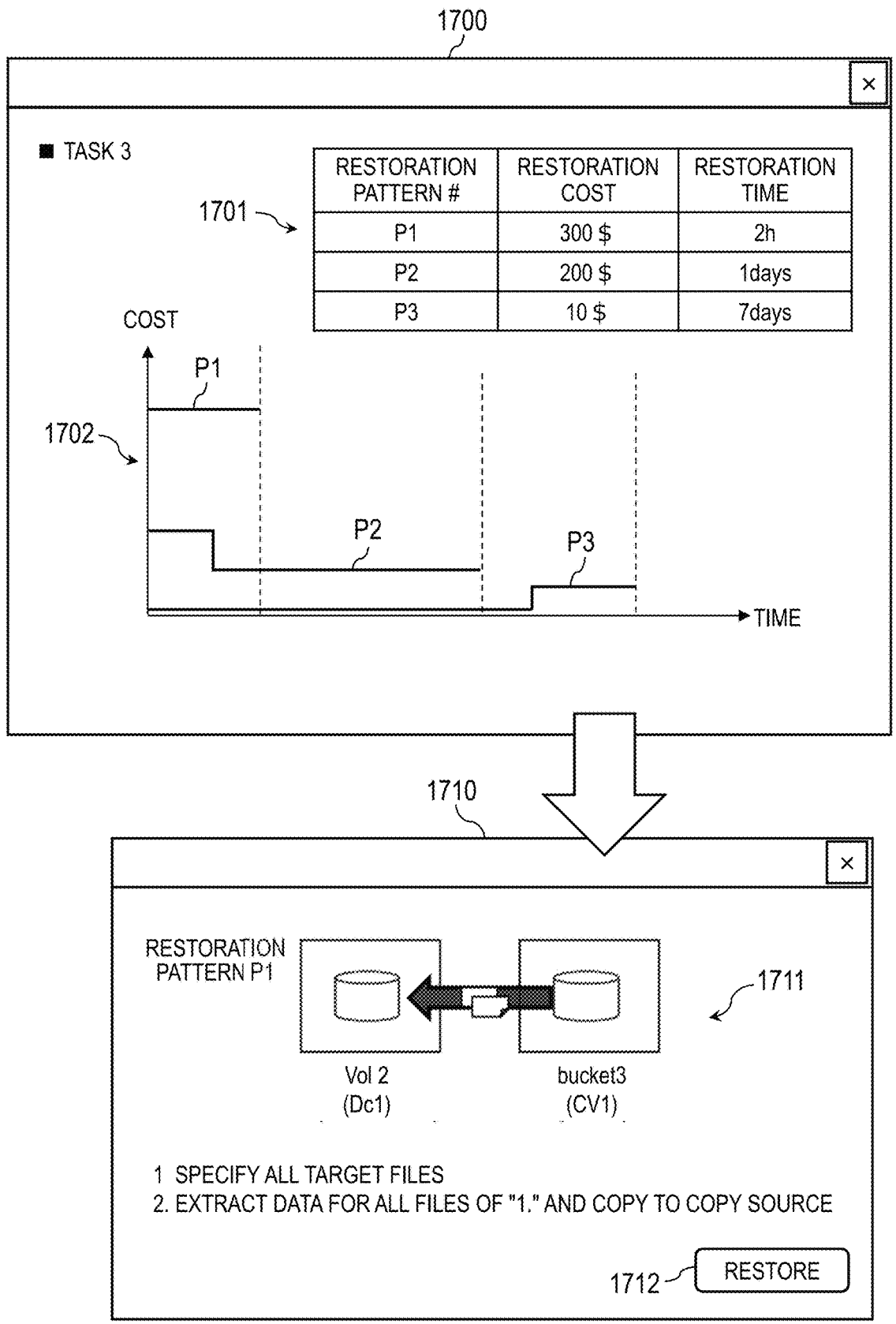
FIG. 17 is an explanatory diagram for illustrating an example of a restoration cost presentation screen.

FIG. 17 is an explanatory diagram for illustrating an example of a restoration cost presentation screen. The restoration cost presentation screen 1700 includes a restoration pattern list 1701 and restoration pattern detailed information 1702. The restoration cost presentation screen 1700 is displayed for each task. The restoration pattern list 1701 displays the restoration cost and the restoration time for each restoration pattern calculated by the management apparatus 103. The restoration pattern detailed information 1702 is a graph for showing a relationship between the restoration cost and the restoration time for each restoration pattern calculated by the management apparatus 103.

When a restoration pattern is selected in the restoration pattern list 1701 or the restoration pattern detailed information 1702, a restoration procedure display screen 1710 is displayed. The restoration procedure display screen 1710 displays the restoration procedure of the restoration pattern selected on the restoration cost presentation screen 1700. Specifically, for example, the restoration procedure display screen 1710 includes restoration procedure information 1711 and a restoration execution button 1712. The restoration procedure information 1711 is information indicating the restoration procedure of the restoration pattern selected on the restoration cost presentation screen 1700. The restoration execution button 1712 is a user interface which executes the restoration in the restoration pattern selected on the restoration cost presentation screen 1700 when the restoration execution button 1712 is pressed.

As described above, according to at least one embodiment of this invention, restoration patterns appropriate for restoration target data can be provided. Moreover, it is possible to provide restoration patterns for a task as a unit by grouping the restoration target data by the task. Further, the application unit 901 is defined in the restoration rule R, and hence the restoration target data can automatically be grouped. Further, the restoration pattern includes the restoration cost, and hence the user can check the cost incurred by the restoration. Further, the restoration pattern includes the restoration time, and hence the user can check the time taken by the restoration. Further, the user can check whether or not the restoration time for the restoration target data is equal to or shorter than the requested restoration time 342 before the restoration, and hence it is possible to prevent such a situation in which the time of the restoration processing exceeds the requested restoration time 342. Further, the restoration pattern includes the restoration procedure, and hence the user can check the sequence of the restoration.

Moreover, it is possible to check the restoration cost and the restoration time of the restoration pattern by associating the restoration cost and the restoration time of the restoration target data. Further, it is possible to check the restoration cost, the restoration time, and the restoration procedure of the restoration pattern by associating the restoration cost, the restoration time, and the restoration procedure of the restoration target data. Further, the management apparatus 103 can generate a restoration pattern for the backup configuration between the on-premises 101 and the public cloud 105, and can generate a restoration pattern between the storages within the public cloud 105.

It should be noted that this disclosure is not limited to the above-mentioned embodiments, and encompasses various modification examples and the equivalent configurations within the scope of the appended claims without departing from the gist of this disclosure. For example, the above-mentioned embodiments are described in detail for a better understanding of this disclosure, and this disclosure is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A management method, which is executed by a management apparatus configured to manage restoration of data backed up to a backup destination to a backup source,
    the management apparatus including a processor configured to execute a program, and a storage device configured to store the program,
    the storage device being configured to store a plurality of restoration rules which define a plurality of patterns relating to the restoration in a restoration configuration indicating a copy source and a copy destination of the data, and backup configuration information relating to the backup source and the backup destination of the data,
    the management method comprising executing, by the processor:
    specification processing of specifying restoration target data;
    selection processing of selecting a specific restoration rule from the plurality of restoration rules; and
    generation processing of generating, by referring to the backup configuration information, in a restoration configuration of the restoration target data in which the backup source of the restoration target data specified by the specification processing is the copy destination and the backup destination of the restoration target data is the copy source, a restoration pattern of the restoration target data in accordance with the specific restoration rule selected by the selection processing.

2. The management method according to claim 1,
    wherein the storage device is configured to store task information which associates the data and a task to which the data is applied with each other,
    wherein the management method further comprises executing, by the processor, grouping processing of grouping a plurality of pieces of the restoration target data by the same task by referring to the task information, and
    wherein the generation processing includes generating, by the processor, by referring to the backup configuration information, in a restoration configuration of the grouped plurality of pieces of the restoration target data in which the backup sources of the plurality of pieces of the restoration target data grouped by the grouping processing are the copy destinations and the backup destinations of the grouped plurality of pieces of the restoration target data are the copy sources, restoration patterns of the grouped plurality of pieces of the restoration target data in accordance with the selected specific restoration rule.

3. The management method according to claim 2,
    wherein each of the plurality of restoration rules defines an application unit being a unit of the data to which the each of the plurality of restoration rules is applied, and
    wherein the management method further comprises executing, by the processor, the grouping processing when the application unit of the specific restoration rule is a plurality of pieces of data grouped by the same task.

4. The management method according to claim 1,
    wherein each of the plurality of restoration rules includes a restoration cost calculation equation for calculating a restoration cost for extracting the data from the copy source and transferring the data to the copy destination based on a data amount of the data and the number of requests for the extraction of the data from the copy source, and
    wherein the generation processing includes calculating, by the processor, through use of the restoration cost calculation equation included in the specific restoration rule, the restoration cost of the restoration target data based on the data amount of the restoration target data and the number of requests for the extraction of the restoration target data from the copy source.

5. The management method according to claim 1,
    wherein each of the plurality of restoration rules includes a restoration time calculation equation for calculating a restoration time being a time required for the restoration based on a data amount of the data and a communication speed of the data between the copy source and the copy destination, and
    wherein the generation processing includes calculating, by the processor, through use of the restoration time calculation equation included in the specific restoration rule, the restoration time of the restoration target data based on the data amount of the restoration target data and the communication speed.

6. The management method according to claim 5, wherein the generation processing includes determining, by the processor, whether the restoration time of the restoration target data is equal to or shorter than a predetermined requested restoration time, and outputting the restoration time of the restoration target data when the restoration time of the restoration target data is equal to or shorter than the predetermined requested restoration time.

7. The management method according to claim 1,
    wherein each of the plurality of restoration rules includes a restoration procedure indicating a sequence of the restoration, and
    wherein the generation processing includes extracting, by the processor, a specific restoration procedure included in the specific restoration rule.

8. The management method according to claim 4,
    wherein each of the plurality of restoration rules includes a restoration time calculation equation for calculating a restoration time being a time required for the restoration based on a data amount of the data and a communication speed of the data between the copy source and the copy destination, and wherein the generation processing includes calculating, by the processor, through use of the restoration time calculation equation included in the specific restoration rule, the restoration time of the restoration target data based on the data amount of the restoration target data and the communication speed, and associating the restoration cost of the restoration target data and the restoration time of the restoration target data with each other, to thereby generate the restoration pattern.

9. The management method according to claim 8, wherein each of the plurality of restoration rules includes a restoration procedure indicating a sequence of the restoration, and wherein the generation processing includes extracting, by the processor, a specific restoration procedure included in the specific restoration rule, and associating the specific restoration procedure with the restoration cost of the restoration target data and the restoration time of the restoration target data, to thereby generate the restoration pattern.

10. The management method according to claim 8, wherein the selection processing includes selecting, by the processor, a plurality of the specific restoration rules, and wherein the generation processing includes generating, by the processor, the restoration pattern for each of the plurality of the specific restoration rules.

11. The management method according to claim 1, wherein the backup destination is a public cloud, and the backup source is on-premises.

12. The management method according to claim 1, wherein the copy source is a first storage in a public cloud, and a copy destination is a second storage in the public cloud.

13. The management method according to claim 1, further comprising executing, by the processor, restoration processing of executing the restoration based on the restoration pattern of the restoration target data generated by the generation processing.

14. A non-transitory recording medium being readable by a processor and having recorded thereon a management program for causing the processor to execute processing of managing restoration of data backed up to a backup destination to a backup source, the processor being configured to access a storage device, the storage device being configured to store a plurality of restoration rules which define a plurality of patterns relating to the restoration in a restoration configuration indicating a copy source and a copy destination of the data, and backup configuration information relating to the backup source and the backup destination of the data, the management program being configured to cause the processor to execute:

specification processing of specifying restoration target data;

selection processing of selecting a specific restoration rule from the plurality of restoration rules; and generation processing of generating, by referring to the backup configuration information, in a restoration configuration of the restoration target data in which the backup source of the restoration target data specified by the specification processing is the copy destination and the backup destination of the restoration target data is the copy source, a restoration pattern of the restoration target data in accordance with the specific restoration rule selected by the selection processing.

15. A management apparatus for managing restoration of data backed up to a backup destination to a backup source, the management apparatus comprising a processor configured to execute a program, and a storage device configured to store the program, the storage device being configured to store a plurality of restoration rules which define a plurality of patterns relating to the restoration in a restoration configuration indicating a copy source and a copy destination of the data, and backup configuration information relating to the backup source and the backup destination of the data, the processor being configured to execute:

specification processing of specifying restoration target data;

selection processing of selecting a specific restoration rule from the plurality of restoration rules; and generation processing of generating, by referring to the backup configuration information, in a restoration configuration of the restoration target data in which the backup source of the restoration target data specified by the specification processing is the copy destination and the backup destination of the restoration target data is the copy source, a restoration pattern of the restoration target data in accordance with the specific restoration rule selected by the selection processing.

* * * * *